(12) United States Patent
Hiramatsu

(10) Patent No.: US 10,451,485 B2
(45) Date of Patent: Oct. 22, 2019

(54) IMAGE DISPLAY DEVICE

(71) Applicant: FANUC CORPORATION, Minamitsuru-gun, Yamanashi (JP)

(72) Inventor: Akio Hiramatsu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 28 days.

(21) Appl. No.: 15/835,805

(22) Filed: Dec. 8, 2017

(65) Prior Publication Data
US 2018/0172518 A1    Jun. 21, 2018

(30) Foreign Application Priority Data

Dec. 21, 2016    (JP) .................................. 2016-248164

(51) Int. Cl.
*G01J 5/02*    (2006.01)
*G01J 5/48*    (2006.01)
(Continued)

(52) U.S. Cl.
CPC ............... *G01J 5/027* (2013.01); *G01J 5/025* (2013.01); *G01J 5/48* (2013.01); *G06T 7/0002* (2013.01);
(Continued)

(58) Field of Classification Search
CPC .... G01J 5/027; G01J 5/025; G01J 5/48; G01J 2005/0077; G01J 2005/0085; G06T 7/0002; G06T 13/20; G06T 15/503; G06T 2207/10048; G06T 2215/16; G06T 2219/008
See application file for complete search history.

(56) References Cited

U.S. PATENT DOCUMENTS 6,282,455 B1 *    8/2001    Engdahl ............. G05B 19/4184
434/72
6,289,299 B1 *    9/2001    Daniel, Jr. ......... G05B 23/0216
345/419
(Continued)

FOREIGN PATENT DOCUMENTS

CN    1923470 A    3/2007
CN    101581606 A    11/2009
(Continued)

OTHER PUBLICATIONS

Decision to Grant a Patent for Japanese Application No. 2016-248164, dated Jul. 31, 2018, with translation, 6 pages.
(Continued)

*Primary Examiner* — Lisa M Caputo
*Assistant Examiner* — Philip L Cotey
(74) *Attorney, Agent, or Firm* — RatnerPrestia

(57) ABSTRACT

An image display device acquires data representing a status of a temperature distribution of a machining machine based on information on machining and generates a temperature distribution image from the acquired data. Further, a three-dimensional machining simulation representing a status of machining is performed to generate a three-dimensional simulation animation and a projection image is generated from the three-dimensional simulation animation. Then, an image obtained by synthesizing the temperature distribution image and the projection image is generated and displayed.

3 Claims, 9 Drawing Sheets

(51) Int. Cl.
*G06T 13/20* (2011.01)
*G06T 7/00* (2017.01)
*G06T 15/50* (2011.01)
*G01J 5/00* (2006.01)

(52) U.S. Cl.
CPC ............ *G06T 13/20* (2013.01); *G06T 15/503* (2013.01); *G01J 2005/0077* (2013.01); *G01J 2005/0085* (2013.01); *G06T 2207/10048* (2013.01); *G06T 2215/16* (2013.01); *G06T 2219/008* (2013.01)

(56) References Cited

U.S. PATENT DOCUMENTS

| | | | |
|---|---|---|---|
| 6,965,376 B2 * | 11/2005 | Tani | G05B 23/0216 340/3.1 |
| 7,423,272 B2 | 9/2008 | Hasegawa et al. | |
| 8,994,729 B2 * | 3/2015 | Nakamura | G06F 3/011 345/427 |
| 2002/0010571 A1 * | 1/2002 | Daniel, Jr. | G05B 23/0216 703/21 |
| 2007/0050091 A1 | 3/2007 | Nagatsuka et al. | |
| 2011/0091070 A1 * | 4/2011 | Havaldar | G06T 13/20 382/103 |
| 2013/0035789 A1 | 2/2013 | Takeda | |
| 2014/0267353 A1 | 9/2014 | Schmidt et al. | |
| 2016/0078681 A1 * | 3/2016 | Shikoda | G06T 19/006 345/633 |
| 2016/0110611 A1 | 4/2016 | Hasegawa | |
| 2016/0260261 A1 * | 9/2016 | Hsu | G06T 19/006 |

FOREIGN PATENT DOCUMENTS

| | | |
|---|---|---|
| CN | 102162752 A | 8/2011 |
| CN | 102909725 A | 2/2013 |
| CN | 104052937 A | 9/2014 |
| CN | 105527921 A | 4/2016 |
| JP | H04017003 A | 1/1992 |
| JP | H07104835 A | 4/1995 |
| JP | H09218100 A | 8/1997 |
| JP | H 09-273964 A | 10/1997 |
| JP | H 10-10220 A | 1/1998 |
| JP | 11-119818 A | 4/1999 |
| JP | 2010140225 A | 6/2010 |
| JP | 2010-181324 A | 8/2010 |

OTHER PUBLICATIONS

Chinese Office Action for Chinese Application No. 201711374970.8, dated Apr. 11, 2019, with translation—16 pages.

* cited by examiner

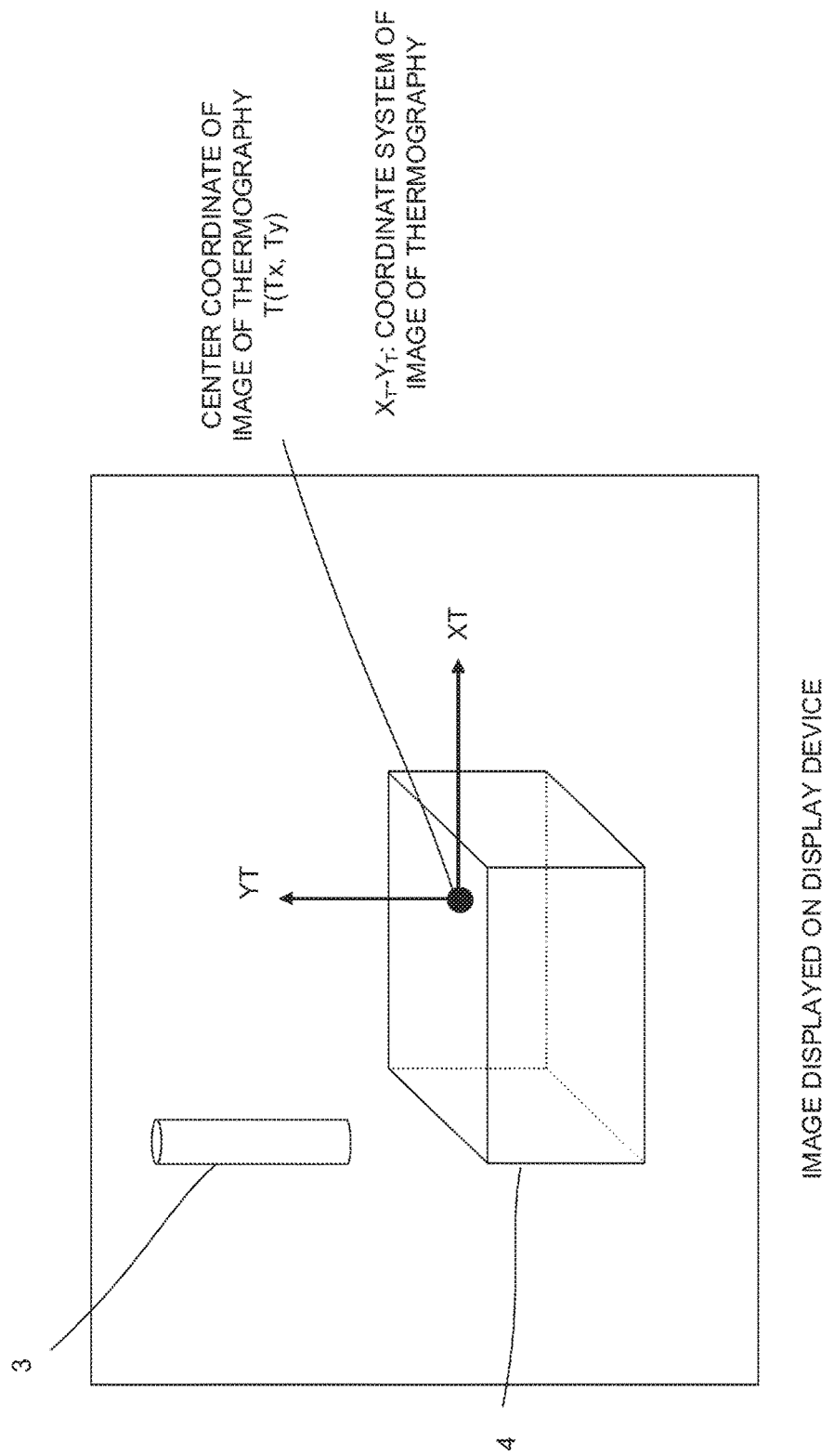

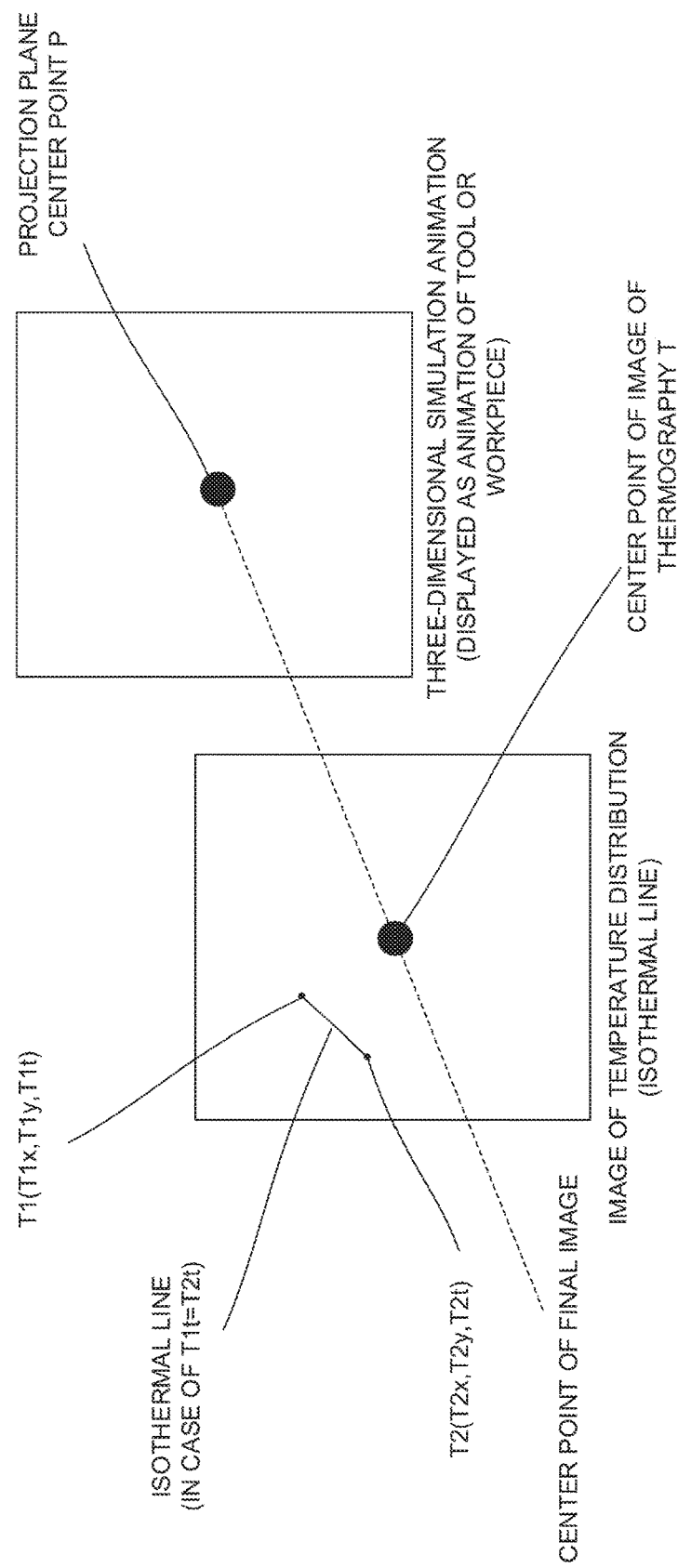

CUTTING FLUID OR CHIPS

CUTTING FLUID OR CHIPS

IMAGE DISPLAY DEVICE

CROSS-REFERENCE TO RELATED APPLICATIONS

This application is a new U.S. Patent Application that claims benefit of Japanese Patent Application No. 2016-248164, filed Dec. 21, 2016, the disclosure of this application is being incorporated herein by reference in its entirety for all purposes.

BACKGROUND OF THE INVENTION

1. Field of the Invention

The present invention relates to an image display device and particularly to an image display device for superimposing and displaying a clear image of a tool or a workpiece and a temperature distribution image.

2. Description of the Related Art

In a machine tool or an industrial machine, there is a need to monitor a temperature of a tool or a workpiece during machining in order to prevent abnormal abrasion or damage of the tool or ensure uniform machining quality. At this time, in order to more accurately determine whether a temperature distribution is normal or abnormal, it is more important to acquire a temperature distribution having a clear temperature gradient in the vicinity of a machining contact point between the tool and the workpiece. Further, since there are many combinations of the tool and the workpiece and the temperature distribution of these combinations are unknown, there is a need to visually check a temperature distribution (temperature distribution used as criteria of machining) at an optimal machining state by a human operator. For this reason, it is desirable to adjust the temperature distribution image as clear as possible.

Here, there is a method of monitoring the temperature of the tool or the workpiece by using a temperature sensor, but since it is difficult to directly attach the temperature sensor depending on the tool or the workpiece in some cases, a thermography (a thermal image measurement device) is used as a non-contact temperature sensor. Incidentally, since the thermography measures infrared rays emitted from an object, a problem arises in that a resolution is lower than that of a visible image obtained by a general camera and a clear image cannot be obtained from a monitoring object.

As a prior art technique of displaying the temperature distribution of the tool and the workpiece using the thermography during the machining of the workpiece, for example, Japanese Patent Application Laid-Open No. 09-273964 discloses a technology of superimposing and displaying an image photographed by a general camera and a temperature distribution image of a tool during machining calculated on the basis of tool cooling characteristics. Further, Japanese Patent Application Laid-Open No. 2010-181324 discloses a technology of superimposing and displaying an image photographed by a general camera and a temperature distribution image acquired by a thermography.

However, in the technology disclosed in Japanese Patent Application Laid-Open No. 09-273964 described above, since the temperature of the tool is not actually measured, it is not possible to calculate a correct temperature distribution when abnormality occurs in the tool such that heat is generated by the abnormal abrasion of the tool. That is, a problem arises in that an abnormal increase in temperature of the tool during the machining of the workpiece cannot be detected.

Further, the technology disclosed in Japanese Patent Application Laid-Open No. 2010-181324 described above is not originally dedicated for machine tools or industrial machines and an influence of a cutting fluid or the like sprayed to the tool or the workpiece during machining is not considered. For that reason, when this technology is used to monitor the tool or the workpiece, a problem arises in that the tool 3 or the workpiece 4 cannot be clearly displayed since a scattering cutting fluid or chips are included in the image of the camera photographing the tool 3 or the workpiece 4 during machining as illustrated in FIGS. 9A and 9B. In addition, FIG. 9A is a diagram illustrating an image display example when an isothermal line is colored and FIG. 9B is a diagram illustrating an image display example when an isothermal line is translucent (not colored).

Furthermore, in the technologies disclosed in Japanese Patent Application Laid-Open No. 09-273964 and Japanese Patent Application Laid-Open No. 2010-181324 described above, since the camera requiring a general visible light is used, a uniform light amount is needed to obtain a clear image, but in the case of the machine tool or the industrial machine, a machining chamber of the machine tool is generally closed in a sealed state when the workpiece is machined. For this reason, in order to continuously obtain the clear image of the tool or the workpiece inside the machining chamber, a facility for supplying a uniform light amount into the machining chamber is additionally needed. As a result, another problem arises in that cost increases.

SUMMARY OF THE INVENTION

Here, an object of the invention is to provide an image display device capable of clearly displaying a temperature distribution of an industrial machine or inside a machining chamber of a machine tool.

In the invention, the above-described problem is solved by displaying a clear image and a temperature distribution of a main part of an industrial machine or near a machining contact point between a workpiece and a tool of a machine tool while superimposing a temperature distribution image of a thermography and a machining simulation image clearly displaying the inside of a machining chamber of the machine tool or a main part of the industrial machine.

Then, the image display device according to the invention is an image display device displaying a temperature distribution of a machine, including: a machining information input unit acquiring machining information relating to machining performed by the machine; a simulation animation generation unit generating a three-dimensional simulation animation by performing a three-dimensional machining simulation representing a machining status of the machine on the basis of the machining information; a temperature distribution data input unit acquiring temperature distribution data representing a status of a temperature distribution of the machine; a temperature distribution image generation unit generating a temperature distribution image on the basis of the temperature distribution data; an image synthesis unit generating an image obtained by synthesizing the temperature distribution image and a projection image generated from the three-dimensional simulation animation; and an image display unit displaying the image generated by the image synthesis unit.

The temperature distribution data may represent a temperature distribution when the machine is viewed from a predetermined viewpoint, and the image synthesis unit may generate an image obtained by synthesizing the temperature distribution image and a projection image when the three-dimensional simulation animation is viewed from the viewpoint.

The temperature distribution data may be acquired by a thermography attached to the machine.

According to the invention, even when a cutting fluid or chips are scattered inside the machining chamber of the machine tool, it is possible to display a clear image and a temperature distribution near a machining contact point between a tool and a workpiece or other portions. Further, it is possible to display a clear image and a temperature distribution of a main part of an industrial machine. Accordingly, when a temperature distribution (a temperature distribution based on machining) at an optimal machining state or an abnormal temperature distribution is visually checked by a human operator, it is possible to highly accurately determine whether the temperature distribution of the parts inside the machining chamber is normal or abnormal and thus to improve the machining error detection or the abnormal abrasion detection of the tool.

Further, since a clear image with a temperature distribution inside the machining chamber is displayed, there is no need to supply light into the machining chamber of the industrial machine or the machine tool and there is no need to install a device for supplying light into the machining chamber. Accordingly, an increase in maintenance cost can be suppressed. Further, since there is no need to supply light at all times for the long-time monitoring, an effect of saving energy can be expected.

BRIEF DESCRIPTION OF THE DRAWINGS

FIG. 5 is a diagram illustrating an example of images synthesized when starting machining;

FIG. 6 is a diagram illustrating an operation of superimposing a temperature distribution image and a projection image of a three-dimensional simulation animation;

DETAILED DESCRIPTION OF THE PREFERRED EMBODIMENTS

Figure 1:
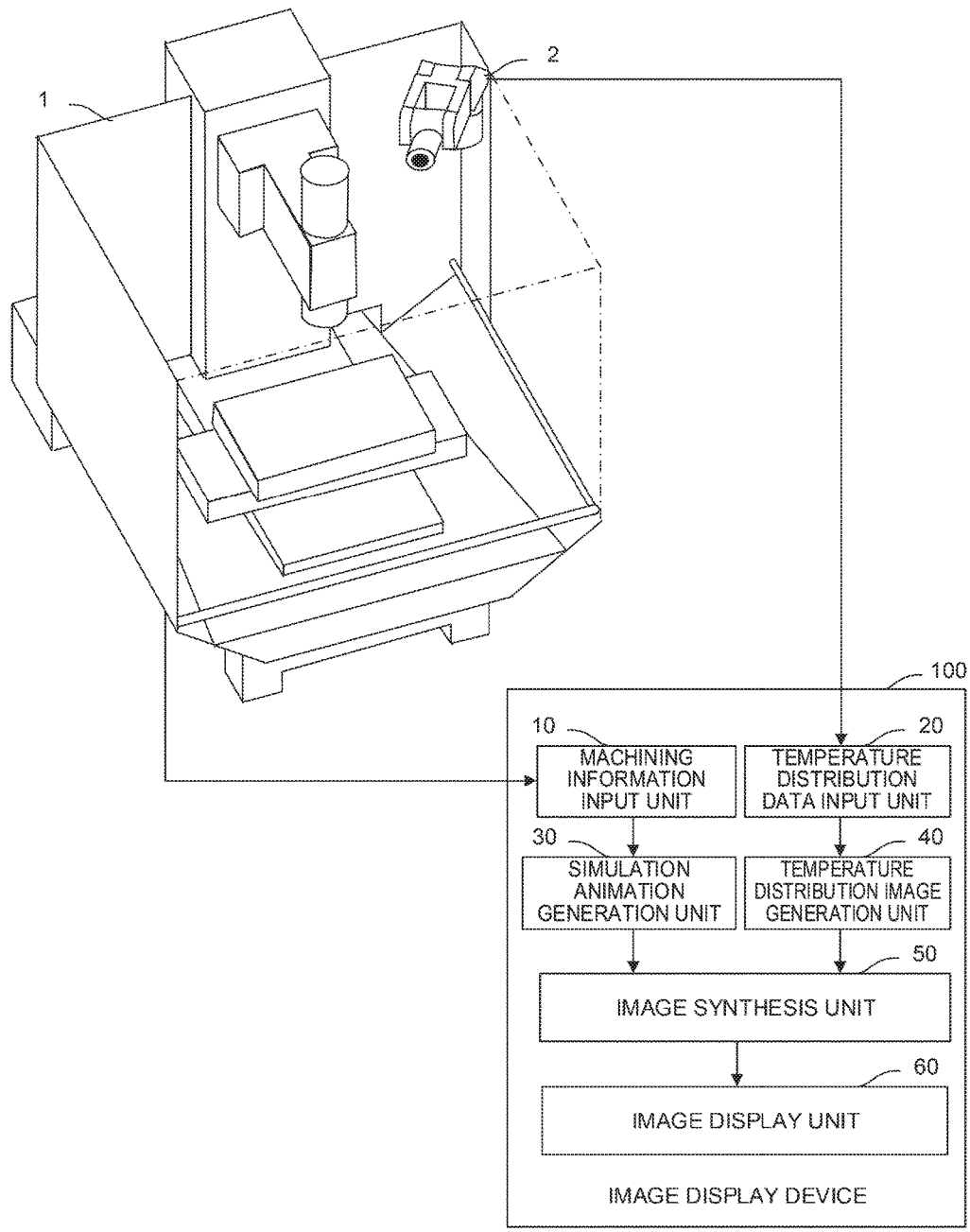
FIG. 1 is a schematic functional block diagram of an image display device according to an embodiment of the invention.

FIG. 1 is a schematic functional block diagram of an image display device according to an embodiment of the invention.

An image display device 100 of the embodiment displays a temperature distribution in a machining chamber including the vicinity of a machining contact point between a tool and a workpiece when the workpiece is machined by a machine tool 1 including a thermography 2. The image display device 100 includes a machining information input unit 10, a temperature distribution data input unit 20, a simulation animation generation unit 30, a temperature distribution image generation unit 40, an image synthesis unit 50, and an image display unit 60.

The machining information input unit 10 is connected to a control unit (not illustrated) of the machine tool 1 and acquires machining information representing a machining status of the machine tool 1. The machining information input unit 10 acquires information necessary for a three-dimensional simulation performed by the simulation animation generation unit 30 as machining information from the control unit of the machine tool 1 every predetermined period. For example, the machining information acquired by the machining information input unit 10 may include information relating to a block of a machining program executed from now on by the control unit of the machine tool 1 or may include information representing a current coordinate position and a movement direction of the tool, the workpiece, and other facilities inside the machining chamber.

The temperature distribution data input unit 20 acquires temperature distribution data on the inside of the machining chamber of the machine tool 1 detected by the thermography (the thermal image measurement device) 2 attached to the machine tool 1 every predetermined period. As the thermography 2 used to acquire the temperature distribution data by the temperature distribution data input unit 20, a general thermography may be used. The thermography 2 may be configured to change a gaze point (a center point of a range in which the thermography 2 detects the temperature distribution) in accordance with the operation of a user using an operation panel of the machine tool 1. Information such as an installation position coordinate value (a machine coordinate value or the like) of the thermography 2, a gaze point coordinate value (a machine coordinate value or the like), and a focal distance may be set by the user through an operation input unit (not illustrated) of the image display device 100 or may be acquired from the control unit of the machine tool 1.

The simulation animation generation unit 30 generates a three-dimensional simulation animation representing the states of the workpiece and the tool inside the machining chamber (the machining space) by performing a three-dimensional simulation of the machining performed by the machine tool 1 on the basis of the machining information acquired by the machining information input unit 10 every predetermined period. The simulation animation generation unit 30 generates the three-dimensional simulation animation by using, for example, three-dimensional models for the tool, the workpiece, or other facilities stored in a memory (not illustrated) in advance. In order to generate the three-dimensional simulation animation by the simulation animation generation unit 30, for example, a general machining simulation method (for example, see Japanese Patent Application Laid-Open No. 10-10220 or Japanese Patent Application Laid-Open No. 11-119818) which has been publicly known may be used.

The temperature distribution image generation unit 40 generates an image (an isothermal image or the like) representing a temperature distribution in the vicinity of the gaze point on the basis of the temperature distribution data on the inside of the machining chamber of the machine tool 1, acquired by the temperature distribution data input unit 20.

The image synthesis unit 50 synthesizes an image in which the temperature distribution image generated by the temperature distribution image generation unit 40 is superimposed on the three-dimensional simulation animation of the inside of the machining chamber of the machine tool 1 generated by the simulation animation generation unit 30. The image synthesis unit 50 synthesizes an image in which the temperature distribution image generated by the temperature distribution image generation unit 40 is superimposed on the image obtained when the three-dimensional simulation animation generated by the simulation animation generation unit 30 is viewed from the viewpoint corresponding to the installation position of the thermography 2. The image synthesis unit 50 synthesizes the images every predetermined period by accompanying the progression of the machining performed by the machine tool 1.

Then, the image synthesized by the image synthesis unit 50 is displayed on the image display unit 60 such as a liquid crystal display device by accompanying the progression of the machining performed by the machine tool 1.

Hereinafter, a general outline of projecting the coordinate of the three-dimensional object to the two-dimensional coordinate will be described with reference to FIGS. 2 and 3.

Figure 2:
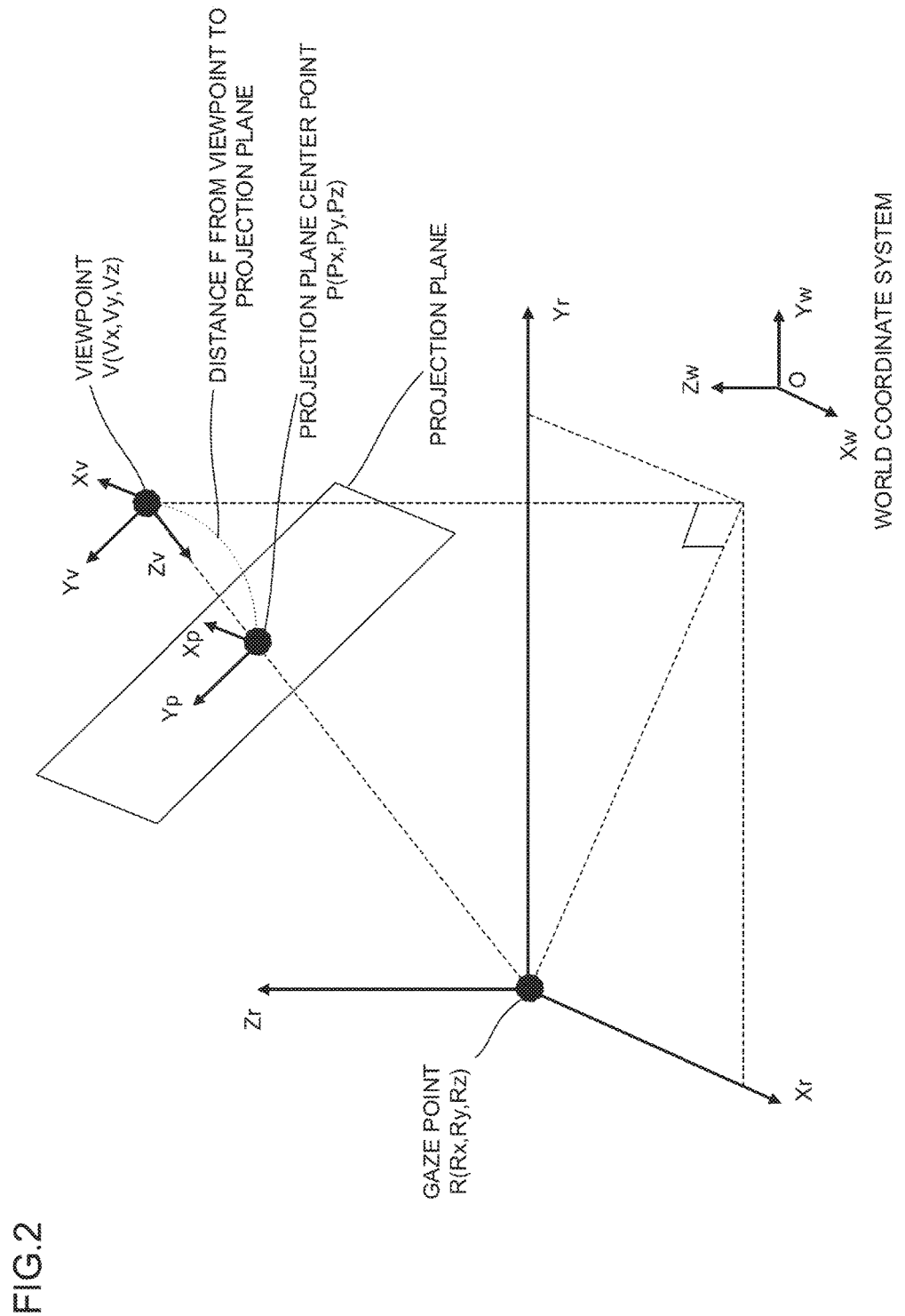
FIG. 2 is a diagram illustrating a general outline of projecting a coordinate of a three-dimensional object to a two-dimensional coordinate in the invention.

As illustrated in FIG. 2, a space in which a three-dimensional object is installed is expressed by an origin O and a coordinate system (a world coordinate system) Xw-Yw-Zw, a point of view from which the three-dimensional object is viewed is set as V (Vx, Vy, Vz), and a coordinate system using the viewpoint V as an origin is set as a viewpoint coordinate system Xv-Yv-Zv. Further, a point (a gaze point) for determining an angle by which the three-dimensional object is viewed is set as R (Rx, Ry, Rz) and a coordinate system using the gaze point R as an origin is set as a gaze point coordinate system Xr-Yr-Zr. Furthermore, when it is assumed that a projection plane is located at a position moved from the viewpoint V toward the gaze point R by a distance f, a center point of a projection plane when viewing the gaze point R from the viewpoint V is set as P (Px, Py, Pz) and a coordinate system using the projection plane center point P as an origin is set as a projection plane center point coordinate system Xp-Yp. Further, for ease explanation, in an example illustrated in FIG. 2, the world coordinate system and the gaze point coordinate system have a relation in which the directions indicated by the X axis, the Y axis, and the Z axis are the same as each other.

In such setting, the points of the world coordinate system are converted into the viewpoint coordinate system. This conversion can be performed, for example, according to the following steps.

Step 1: the world coordinate system and the gaze point coordinate system are moved in parallel so that both origins overlap each other.

Step 2: the gaze point coordinate system and the viewpoint coordinate system are moved in parallel so that both of the origins thereof overlap each other.

Step 3: the world coordinate system and the viewpoint coordinate system are rotated so that both of the Z axes thereof overlap each other.

Figure 3:
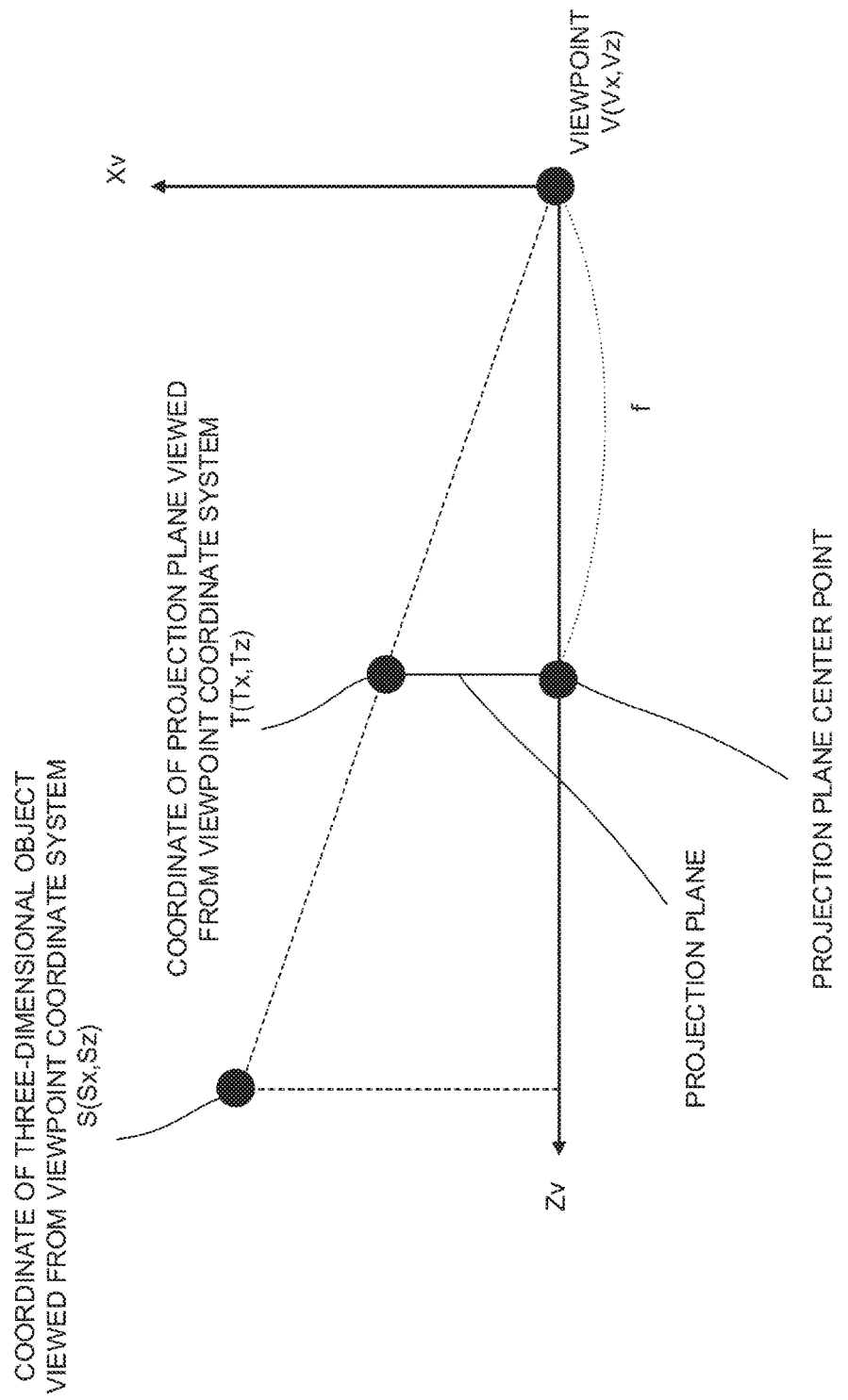
FIG. 3 is another diagram illustrating a general outline of projecting a coordinate of a three-dimensional object to a two-dimensional coordinate in the invention.

Next, a relation between the coordinate S (Sx, Sy) as viewed from the viewpoint coordinate system of the three-dimensional object and a coordinate T (Tx, Tz) on the projection plane when the coordinate S is viewed from the viewpoint coordinate system can be expressed by the following expression (1) on the basis of the similarity between a general outline of perspective projection illustrated in FIG. 3 and a triangle. In addition, the general outline diagram illustrated in FIG. 3 is expressed on the plane Xv-Zv of the viewpoint coordinate system, but can be expressed in the same way even on the plane Yv-Zv.

$$S_z : f = S_x : T_x$$

$$S_z : f = S_y : T_y \tag{1}$$

Thus, the coordinate T (Tx, Tz) on projection plane corresponding to the coordinate S (Sx, Sy) as viewed from the viewpoint coordinate system can be expressed by the following expression (2).

$$T_x = f \times \frac{S_x}{S_z} \tag{2}$$

$$T_y = f \times \frac{S_y}{S_z}$$

Thus, parameters necessary for projecting the coordinate of the three-dimensional object to the two-dimensional coordinate can be summarized as below.

Parameter 1: origin O of the world coordinate system

Parameter 2: viewpoint V as viewed from world coordinate system

Parameter 3: gaze point R as viewed from world coordinate system

Parameter 4: distance f between viewpoint V and projection plane center point P

Parameter 5: coordinate S (Sx, Sy, Sz) of three-dimensional object as viewed from viewpoint coordinate system.

On the assumption that the machine coordinate system of the machine tool 1 is set as the above-described world coordinate system, the coordinate (the position of the infrared lens) of the thermography 2 is set as the viewpoint V, the center point of the range of detecting the temperature distribution by the thermography 2 is set as the gaze point R, and the focal distance of the thermography 2 is set as f, the image synthesis unit 50 converts each of the coordinate points S (Sx, Sy, Sz) of the three-dimensional space of the three-dimensional simulation animation of the inside of the machining chamber of the machine tool 1 generated by the simulation animation generation unit 30 into the coordinate on the temperature distribution image (the projection plane) generated by the temperature distribution image generation unit 40, thereby synthesizing an image in which the temperature distribution image generated by the temperature distribution image generation unit 40 is superimposed on the three-dimensional simulation animation of the inside of the machining chamber of the machine tool 1 generated by the simulation animation generation unit 30.

Hereinafter, a step in which the image display device 100 of the embodiment with the above-described configuration synthesizes and displays the images of the inside of the machining chamber of the machine tool 1 will be described.

First, as a general preparation before machining, an NC program is created by defining a workpiece coordinate system through the operation of the control unit (generally, a numerical controller) of the machine tool 1. In general, the workpiece coordinate serves as the coordinate of a machining point between the tool and the workpiece and, in the NC program, the tool movement amount or the like is instructed by using the workpiece coordinate system.

The image synthesis unit 50 converts the coordinate system or points as described above in order to project the tool, the workpiece, or other facilities (the three-dimensional objects) inside the machining chamber on the projection plane on the basis of the setting values set by the user or the setting values acquired from the control unit of the machine tool 1.

Figure 4:
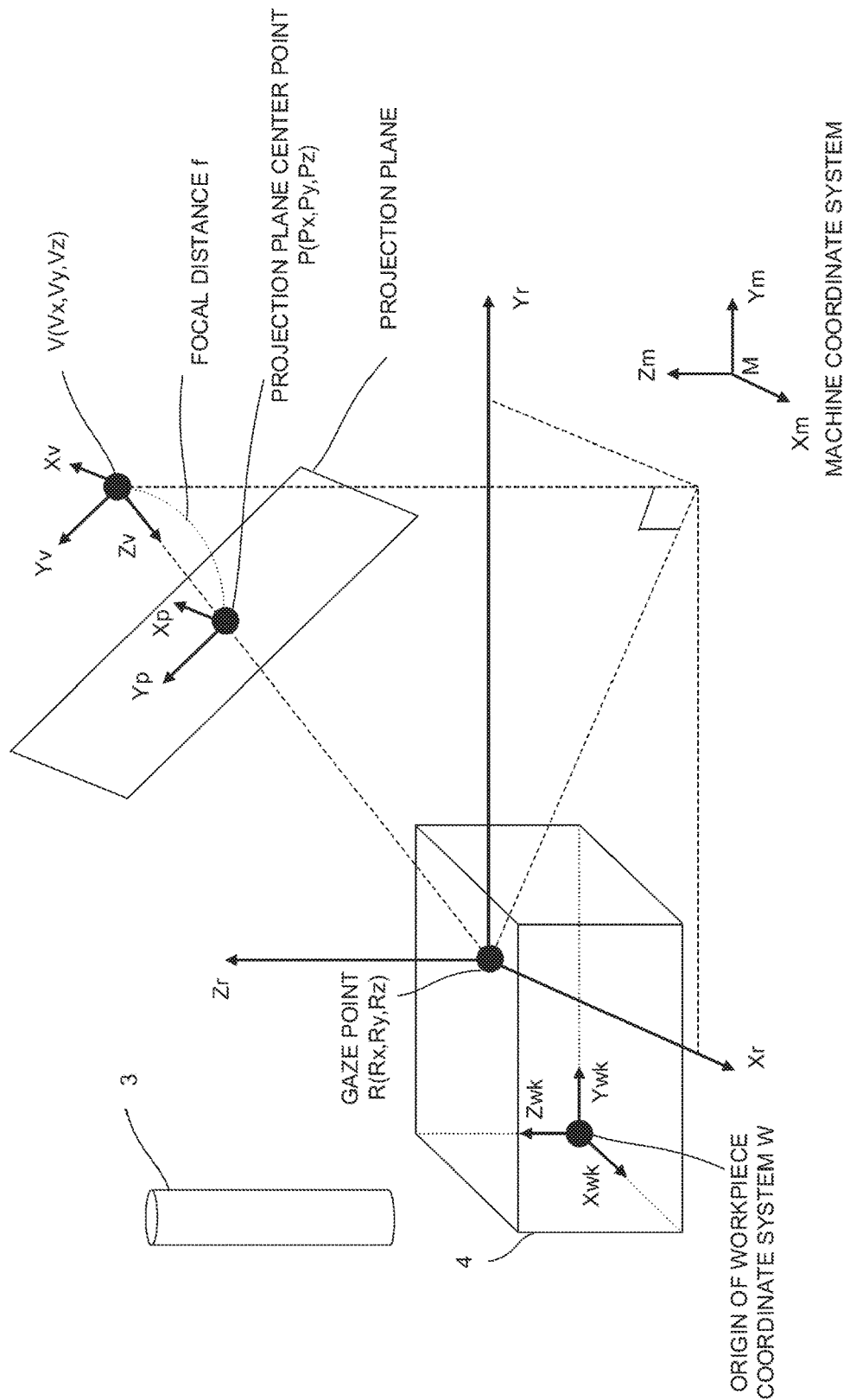
FIG. 4 is a diagram illustrating an example in a case where the general outline of projecting the coordinate of the three-dimensional object to the two-dimensional coordinate illustrated in FIG. 2 is applied to a machine coordinate system of a machine tool.

FIG. 4 is a diagram illustrating a case where a general outline of projecting the coordinate of the three-dimensional object to the two-dimensional coordinate described with reference to FIG. 2 is applied to the coordinate system of the actual machine tool 1 and the thermography 2. Further, an example of FIG. 4 illustrates milling. In FIG. 4, Reference Numeral 3 indicates the tool and Reference Numeral 4 indicates the workpiece.

Since the origin M of the machine coordinate system, among the parameters necessary for synthesizing the images by the image synthesis unit 50, is determined by the control unit of the machine tool 1, the origin may be acquired from the control unit.

Further, since the position V (Vx, Vy, Vz) of the infrared lens of the thermography 2 as viewed from the machine coordinate system is determined by the installation position of the thermography 2 as viewed from the machine coordinate system, the position V may be acquired from the installation position of the thermography 2 in case where the position V is set by the control unit of the machine tool 1. In other cases, the user may set the position V by operating the image display device 100.

The gaze point R as viewed from the machine coordinate system can be set to an intersection point between the workpiece surface and the line perpendicular to the projection plane from the position V of the infrared lens of the thermography 2. In addition, since the coordinate of the workpiece as viewed from the machine coordinate system can be obtained from the workpiece shape information, the coordinate of the workpiece may be acquired from the workpiece shape information in case where the coordinate is set by the control unit of the machine tool 1. In other cases, the user may set the coordinate by operating the image display device 100.

Since the focal distance f of the infrared lens of the thermography 2 is determined depending on the characteristics of the infrared lens of the thermography 2 in use, the focal distance may be acquired from the characteristics of the infrared lens in case where the focal distance can be acquired from the thermography 2. In other cases, the user may set the focal distance by operating the image display device 100.

Since the coordinates S of the points of the tool, the workpiece, or other facilities inside the machining chamber as viewed from the coordinate system of the position V of the infrared lens of the thermography can be acquired from the execution result of the three-dimensional simulation of the machining in the machine tool 1, performed by the simulation animation generation unit 30 on the basis of the machining information, the coordinate S can be obtained by converting the coordinate of the world coordinate system of each point in the virtual space in the three-dimensional simulation into the viewpoint coordinate system according to the above-described method.

FIG. 5 is an example of an image formed by projecting the three-dimensional simulation animation generated by the simulation animation generation unit 30 on the projection plane in the image synthesis unit 50 at the time of starting the machining.

Next, when the machining of the workpiece 4 is started by the machine tool using the tool 3, the machining information input unit 10 acquires the machining information from the control unit of the machine tool 1 every predetermined period and the temperature distribution data input unit 20 acquires the temperature distribution data from the thermography 2 every predetermined period. The temperature distribution data acquired from the thermography 2 by the temperature distribution data input unit 20 includes the coordinate value (Tx, Ty) (corresponding to the coordinate value on a projection plane coordinate system) in the range of the temperature distribution data acquired by the thermography 2 and the temperature Tt measured at the coordinate indicated by the coordinate value, and acquires the data items T1 (T1$x$, T1$y$, T1$t$), T2 (T2$x$, T2$y$, T2$t$), . . . , Tn (Tn$x$, Tn$y$, Tn$t$) of a plurality of points (generally, thousand points) on the plane photographed by the thermography 2 in each acquiring operation.

The simulation animation generation unit 30 generates the three-dimensional simulation animation by performing the three-dimensional simulation on the basis of the machining information acquired by the machining information input unit 10.

Further, the temperature distribution image generation unit 40 generates the temperature distribution image on the basis of the temperature distribution data acquired by the temperature distribution data input unit 20. The temperature distribution image generation unit 40 generates, for example, an isothermal image on the basis of the acquired temperature distribution data. The isothermal image which is generated by the temperature distribution image generation unit 40 is generated by plotting the temperature distribution data on the plane and connecting the same temperature values. The temperature distribution image generation unit 40 colors the isothermal lines with different colors in order to easily and visually check the temperature distribution of the isothermal on the isothermal image.

Then, as illustrated in FIG. 6, the image synthesis unit 50 superimposes the isothermal image generated by the temperature distribution image generation unit 40 on the projection image obtained by projecting the machining simulation animation on the projection plane in a manner such that the center point T of the temperature distribution image, generated on the basis of the temperature distribution data acquired from the thermography 2, matches the projection plane center point P of the three-dimensional simulation animation, thereby synthesizing these two images.

Figure 7A:
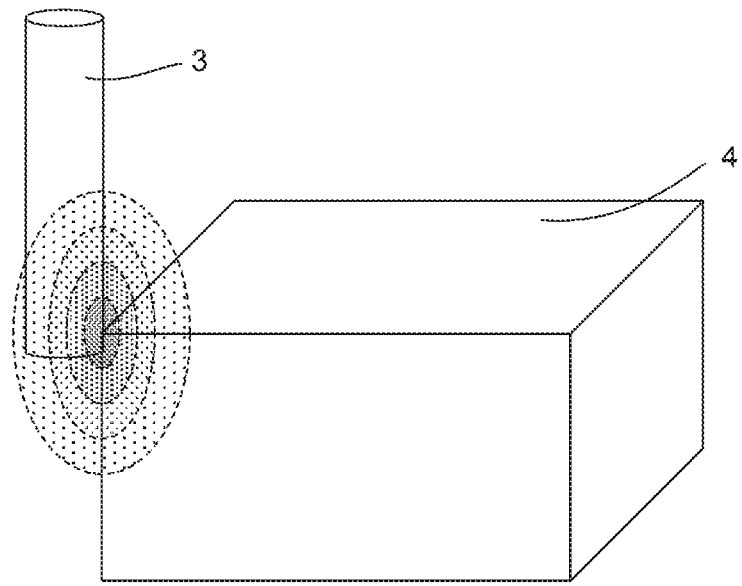
FIGS. 7A and 7B are diagrams illustrating an image display example of the image display device according to the embodiment of the invention.
Figure 7B:
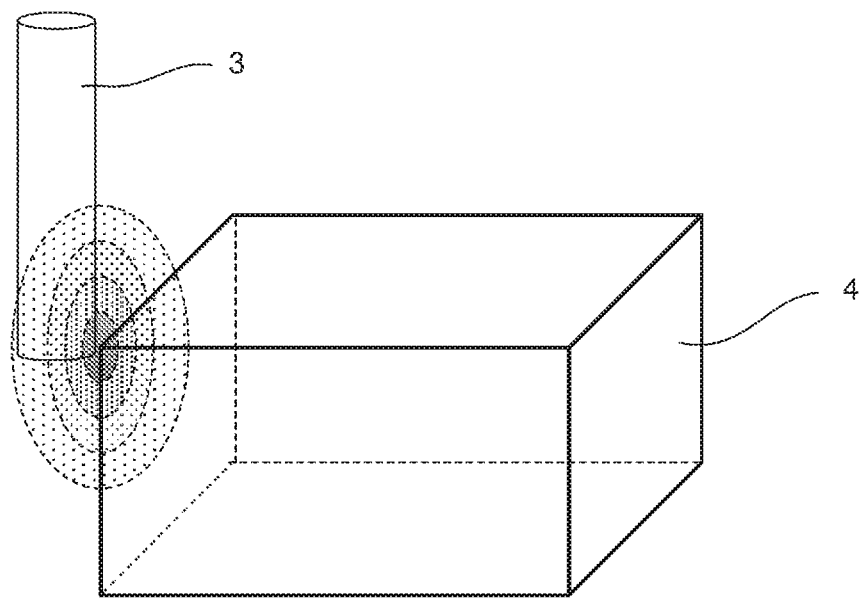

FIGS. 7A and 7B are examples of images displayed on the image display unit 60 of the image display device 100 of the embodiment. By using publicly known image synthesizing and image processing technologies, the image synthesis unit 50 can superimpose a translucent temperature distribution image on a three-dimensional simulation animation, as illustrated in FIG. 7A or can superimpose a temperature distribution image on an image emphasizing the outline of the tool 3, the workpiece 4, or other facilities inside the machining chamber in the three-dimensional simulation animation as illustrated in FIG. 7B.

Although the embodiment of the invention has been described so far, the invention is not limited only to the examples of the above-described embodiment and can be implemented in various forms by appropriate modifications.

Figure 8:
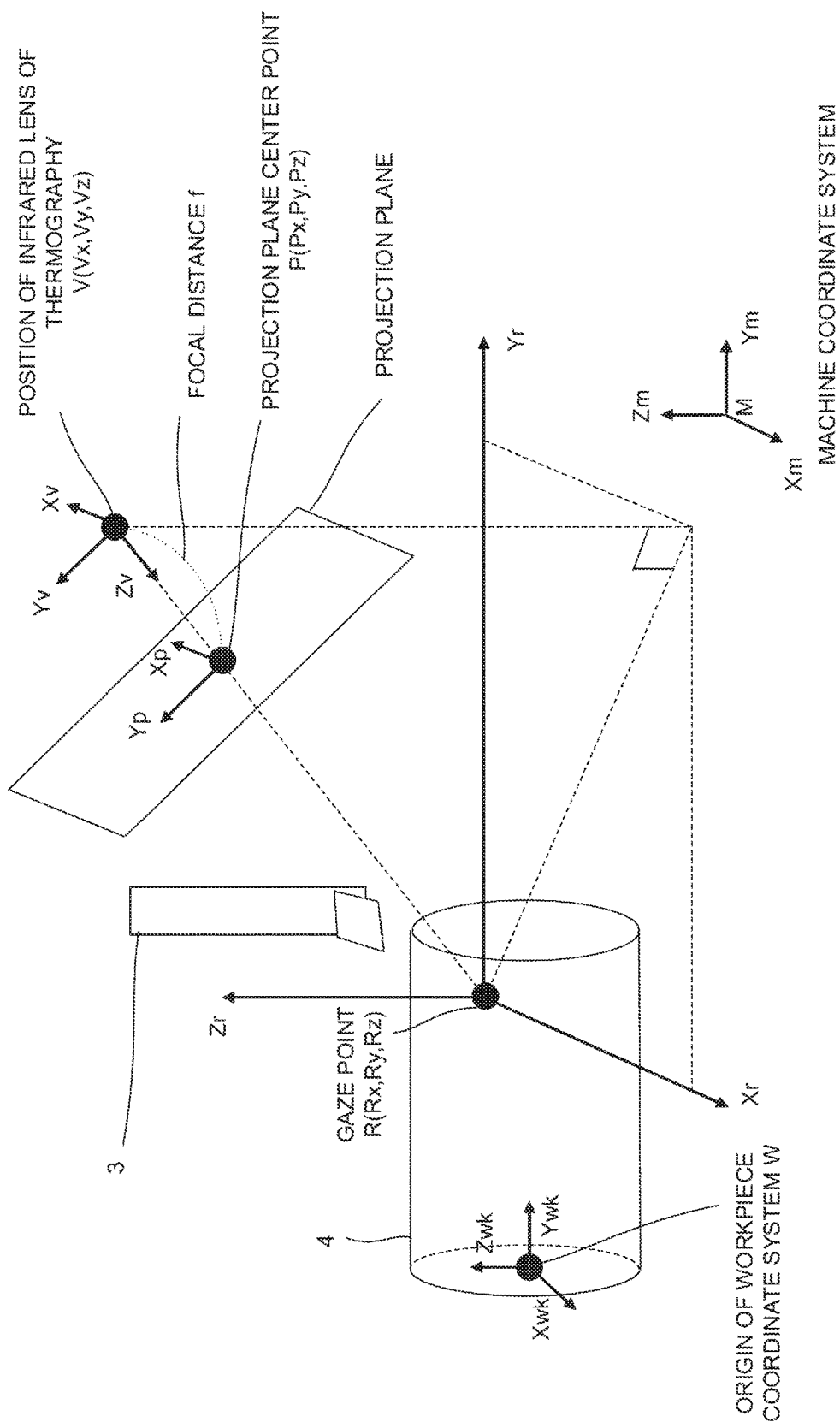
FIG. 8 is a diagram illustrating an example of a case where a technology of the invention is applied to lathe machining.
Figure 9A:
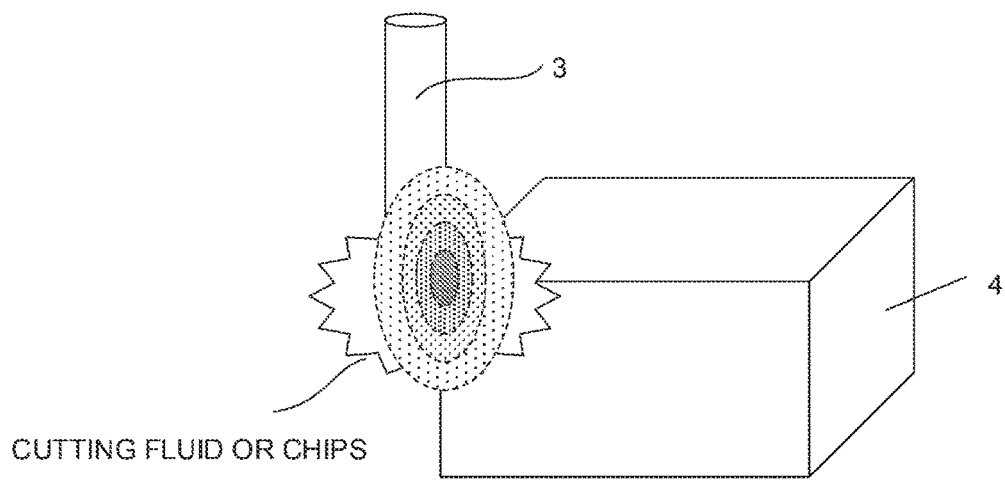
FIGS. 9A and 9B are diagrams illustrating an image display example inside a machining chamber of prior art.
Figure 9B:
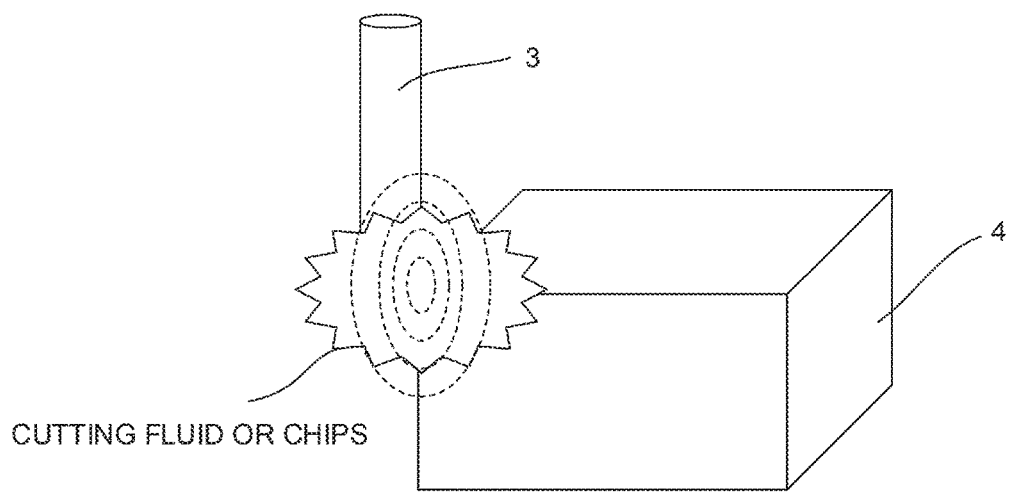

For example, in the above-described, an example of milling has been described, but as illustrated in FIG. 8, the method of the present invention can be also applied to lathe machining. Further, the invention can be also applied to other industrial machines.

Further, in the above-described embodiment, an example has been described in which the thermography is used as the sensor for acquiring the temperature distribution data, but any sensor capable of measuring the temperature distribution as viewed from a predetermined viewpoint may be used.

The invention claimed is:

1. An image display device to display a temperature distribution of a machine, comprising a processor configured to:
    acquire machining information relating to machining performed by the machine;
    generate a three-dimensional simulation animation by performing a three-dimensional machining simulation representing a machining status of the machine on the basis of the machining information;
    acquire temperature distribution data representing a status of a temperature distribution of the machine;
    generate a temperature distribution image on the basis of the temperature distribution data;
    generate an image obtained by synthesizing the temperature distribution image and a projection image generated from the three-dimensional simulation animation; and
    display the generated image.

2. The image display device according to claim 1,
    wherein the temperature distribution data represents a temperature distribution when the machine is viewed from a predetermined viewpoint, and
    the processor generates an image obtained by synthesizing the temperature distribution image and a projection image when the three-dimensional simulation animation is viewed from the viewpoint.

3. The image display device according to claim 1,
    wherein the temperature distribution data is acquired by a thermography attached to the machine.

* * * * *